United States Patent
MacAulay et al.

(10) Patent No.: US 7,274,809 B2
(45) Date of Patent: Sep. 25, 2007

(54) COMPUTERIZED METHODS AND SYSTEMS RELATED TO THE DETECTION OF MALIGNANCY-ASSOCIATED CHANGES (MAC) TO DETECT CANCER

(75) Inventors: Calum E. MacAulay, Vancouver (CA); Alexei K. Doudkine, Delta (CA); David M. Garner, Vancouver (CA); Margareta Flezar, Ljubljana (SI); Mario Zganec, Golnik (SI); Jaka Lavrencak, Ljubljana (SI); Branko M. Palcic, Vancouver (CA); Gary W. Ferguson, Burnaby (CA)

(73) Assignee: Perceptronix Medical, Inc. and British Columbia Cancer Agency, Vancouver, BC (CA)

( * ) Notice: Subject to any disclaimer, the term of this patent is extended or adjusted under 35 U.S.C. 154(b) by 783 days.

(21) Appl. No.: 10/232,698

(22) Filed: Aug. 29, 2002

(65) Prior Publication Data

US 2004/0042646 A1  Mar. 4, 2004

(51) Int. Cl.
*G06K 9/00* (2006.01)
(52) U.S. Cl. .................. 382/128; 382/129; 382/134
(58) Field of Classification Search ......... 382/128–134
See application file for complete search history.

(56) References Cited

U.S. PATENT DOCUMENTS

| | | | |
|---|---|---|---|
| 3,907,437 A | 9/1975 | Hirschfield | 356/156 |
| 4,129,854 A | 12/1978 | Suzuki | 340/146.3 CCA |
| 4,453,266 A * | 6/1984 | Bacus | 382/134 |
| 5,016,283 A | 5/1991 | Bacus | 382/6 |
| 5,018,209 A | 5/1991 | Bacus | 382/6 |
| 5,107,422 A * | 4/1992 | Kamentsky et al. | 382/133 |
| 5,168,066 A | 12/1992 | Zahniser | 436/63 |
| 5,485,527 A | 1/1996 | Bacus | 382/128 |
| 5,784,193 A | 7/1998 | Ferguson | 359/398 |
| 5,889,881 A | 3/1999 | MacAulay | 382/133 |
| 5,942,410 A | 8/1999 | Lam | 435/40.5 |
| 5,978,497 A | 11/1999 | Lee et al. | 382/133 |
| 6,007,996 A * | 12/1999 | McNamara et al. | 435/6 |
| 6,026,174 A * | 2/2000 | Palcic et al. | 382/133 |

(Continued)

FOREIGN PATENT DOCUMENTS

EP    0421736 A2    4/1991

OTHER PUBLICATIONS

PCT International Search Report, PCT/CA03/01262, Dec. 18, 2003.

(Continued)

*Primary Examiner*—Matthew C. Bella
*Assistant Examiner*—Patrick Edwards
(74) *Attorney, Agent, or Firm*—Trexler, Bushnell, Giangiorgi, Blackstone & Marr, Ltd.

(57) ABSTRACT

Computer programs, systems and the like related to processing, segmenting and feature normalizing digital images. The images are of cells and the methods are useful for the detection of malignancy-associated changes (MAC) in cells, which can be used for the detection of cancer. The programs and methods detect cancer in one tissue by detecting MAC in another tissue, such as associated tissues or non-associated tissues. Examples of associated tissues include nipple aspirates or ductal washings to detect breast cancer, and sputum or bronchial lavage to detect lung cancer. Examples of non-associated tissues include buccal mucosa to detect lung or breast cancer.

56 Claims, 6 Drawing Sheets

U.S. PATENT DOCUMENTS

| | | | |
|---|---|---|---|
| 6,168,779 B1 | 1/2001 | Barsky | 424/9.2 |
| 6,205,348 B1* | 3/2001 | Giger et al. | 600/407 |
| 6,221,622 B1 | 4/2001 | Love | 435/7.23 |
| 6,287,521 B1 | 9/2001 | Quay | 422/101 |
| 6,316,189 B1 | 11/2001 | Haddad | 435/6 |
| 2003/0104499 A1* | 6/2003 | Pressman et al. | 435/7.23 |

OTHER PUBLICATIONS

Fukuda et al., Errors in Absorbance Cytophotometry, 1979.

Henryk Klawe and Jan Rowinski, Malignancy Associated Changes (MAC) in Cells of Biccal Smears Detected by Means of Objective Image Analysis, Acta Cytologica, 18: 30-33 (1974).

Jerome J. Decosse and Nancy Alello, Feulgen Hydrolysis: Effect of Acid and Temperature, Journal of Histochemistry and Cytochemistry, 14: 601-604 (1996).

Nicholas L. Petrakis, Nipple Aspirate Fluid in Epidemologic Studies of Breast Disease, Epidemologic Reviews, 15: 188-195 (1993).

Nicholas L. Petrakis, Physiologic, biochemical, and cytologic aspects of nipple aspirate fluid, Breast Cancer Research and Treatment, 8: 7-19 (1986).

Robert R. Finch and Emmerich von Hamm, Malignancy Associated Changes in Buccal Smears, Acta Cytologica, 15: 46-49 (1971).

* cited by examiner

| IOD | Difference | Value | V*V |
|---|---|---|---|
| A | 72 | A-B | 48 | 2304 |
| B | 120 | B-C | 24 | 576 |
| C | 96 | C-D | 24 | 576 |
| D | 72 | D-E | 24 | 576 |
| E | 96 | E-F | 24 | 576 |
| F | 120 | F-G | 72 | 5144 |
| G | 48 | G-0 | 48 | 2304 |
| Sum of values | | | 12056 |

Value (12056) * factor (0.833) = 10,043

| IOD | Difference | Value | V*V |
|---|---|---|---|
| A | 60 | A-B | 40 | 1600 |
| B | 100 | B-C | 20 | 400 |
| C | 80 | C-D | 20 | 400 |
| D | 60 | D-E | 20 | 400 |
| E | 80 | E-F | 20 | 400 |
| F | 100 | F-G | 60 | 3600 |
| G | 40 | G-0 | 40 | 1600 |
| Sum of values | | | 8400 |

COMPUTERIZED METHODS AND SYSTEMS RELATED TO THE DETECTION OF MALIGNANCY-ASSOCIATED CHANGES (MAC) TO DETECT CANCER

BACKGROUND

Computer analysis of digital images of biological material is known as image cytometry. In image cytometry, computer controlled cameras take magnified images of cellular material then analyze the digital images to locate objects and subsequently identify (classify) some of these objects as cells. The cells are then examined for various purposes, such as determining whether the cells are healthy or cancerous. Typically, biological material is first stained to increase visualization of cellular structure or chemical composition. Certain stains or proteins bind specifically, and proportionally, to certain parts of cells or their constituents, for example, surface proteins or DNA. One example of this is Feulgen staining, which proportionally binds a stain to the DNA, which means that the more DNA there is, the darker the staining. Once DNA is stained proportionally, which in some instances can be referred to as stoichiometrically, the total amount and relative distribution of the DNA in the nucleus of a cell can be measured.

Image cytometry can be used to scan and analyze DNA stained cells to determine whether, for example, the cells have malignancy associated changes (MAC); MAC are changes associated with the spatial distribution of DNA in non-cancerous cells, MAC changes appears more frequently when a cancer is present in other cells. MAC is discussed, for example, in Finch, et al., Malignancy Associated Changes in Buccal Smears, Acta Cytologica 15: 46-49 (1971); Klawe et al., Malignancy Associated Changes (MAC) in Cells of Buccal Smears detected by means of Objective Image Analysis, Acta Cytologica 18: 30-33 (1974); U.S. Pat. No. 5,889,881; U.S. Pat. No. 6,026,174. However, it has been difficult to reliably assess the presence of MAC. For example, DNA staining using the Feulgen method may still be proportional, yet vary in overall darkness, from batch to batch due to minor variations in temperature, chemical concentrations, hydrolysis times, chromatin compactness, or other factors.

Accordingly, there has gone unmet a need for improved computer-implemented programs suitable for image cytometry that can correct or reduce variations due to staining. There has also gone unmet a need for reliable methods of detecting MAC in cells. The present invention provides these and other advantages.

SUMMARY

Computer-implemented, or automated image cytometry is a complex but useful analytical tool. As discussed above, staining variations between samples make it difficult to directly compare one sample to another, or to compare a sample to a standard. Overcoming such staining variation enhances the ability to detect subtle changes in DNA distribution in cell nuclei and, therefore, MAC. MAC provides the potential to detect the probability of cancer in a patient without having to rely exclusively on the presence of cancerous cells in the sample. This can make cancer diagnosis or screening more practical, less invasive, less painful, less expensive, and quicker. The present invention provides computers, methods, systems and the like that provide for enhanced image analysis and thus enhanced detection of MAC. This, in turn, increases the likelihood that cancer will be detected at an earlier, more treatable stage and imposes less of a burden on cancer patients and on patients undergoing cancer screening.

In one aspect, computer-implemented methods of photometrically correcting digital images for the analysis of cellular features to determine malignancy-associated changes (MAC) are provided. The methods can comprise a) providing at least one digital image of a sample of DNA stained cells, said sample comprising enough cells to determine a reference population of cells having a certain DNA content; b) determining a photometric correction factor that adjusts optical measurements of the certain DNA content cells substantially to a predetermined target value corresponding to optical measurements within a reference data set that can comprise optical measurements indicating the presence or absence of MAC; c) applying the photometric correction factor to desired pixels of the digital image to provide a normalized digital image; d) calculating optical features from the normalized digital image; and e) comparing optical features determined from the normalized image to the reference data set to determine whether the sample can comprise MAC.

In this and other embodiments (unless expressly stated otherwise or clear from the context, all embodiments, aspects, features, etc., of the present invention can be mixed and matched, combined and permuted in any desired manner), the certain DNA content cells can be diploid cells and the photometric correction factor can be determined such that the corrected DNA content measure of the diploid cells in the sample and diploid cells in the reference data set have a relative value of about one and a corrected DNA content measure of tetraploid cells has a relative value of about two. The methods further can comprise determining whether the sample does contain MAC. The optical measurement can comprise measuring an integrated optical density (IOD) and the reference data set can comprise a target IOD, and the photometric correction factor can be determined as target IOD/measured IOD, and the digital image can comprise optical intensity information and the optical intensity can be corrected by multiplying the optical intensity by the photometric correction factor.

The methods further can comprise at least one of applying the photometric correction factor to at least desired pixels in objects in the image and providing adjusted pixel values for at least one of an optical density and an integrated optical density. An improved correction coefficient can be provided by repeating at least b) and c) at least one time as significantly more cells in the sample can be analyzed, for example additional groups of about 200 more cells. At least d) and e) can also be repeated, using the improved correction coefficient to provide improved adjusted pixel values and an improved determination of the at least one optical feature. The stained DNA can be stained with Feulgen staining methods or otherwise with an absorbance, fluorescence, etc., stain.

The methods further can comprise providing at least one control, for example providing at least one digital image of a known substance having a known optical density. The control can be stained substantially simultaneously with the tissue sample if it is a stainable control. The methods further can comprise determining a plurality of optical features from the adjusted pixel values, at least one of the plurality of optical features determined using linear or non-linear functions. The reference data set further can comprise digital images of reference cells. The methods further can comprise applying the photometric correction factor to substantially all pixels in objects in the image.

The sample can be from a patient potentially having a selected malignancy and the sample can be from a non-associated tissue, and the patient can have an internal cancer and the non-associated tissue can be an available or non-available tissue. For example, the selected malignancy can be lung cancer and the non-associated tissue can comprise buccal mucosa or the selected malignancy can be breast cancer and the non-associated tissue can comprise at least one of buccal mucosa, nipple aspirates, and ductal washings. The patient, and thus the substantially non-cancerous tissue sample can be human.

In a further aspect, methods of making a dataset comprising discriminant image cytometry features associated with MAC is provided. The methods comprise: a) providing a digital cytometric image of a sample of cells comprising proportionally stained DNA, the sample comprising enough cells to provide a DNA content measure of cells that have a certain DNA content; b) analyzing the cells that have the certain DNA content to determine at least one of an optical intensity, optical density (OD) and an integrated optical density (IOD) value of the DNA content to provide an initial DNA content measure; c) determining a photometric correction factor that adjusts the initial DNA content measure to provide a corrected DNA content measure of the certain DNA content cells, which corrected DNA content measure has a relative value substantially equal to a reference DNA content measure for cells of substantially equivalent DNA content in a reference dataset, the reference dataset comprising discriminant image cytometry features associated with MAC; d) applying the photometric correction factor to at least desired pixels of the image to normalize the image to provide adjusted pixel values on at least an optical density scale; e) comparing optical features determined from the adjusted pixel values to the reference dataset and determining therefrom that the sample can comprise MAC; and, f) combining the optical features from the adjusted pixel values with the reference dataset to provide an improved reference dataset.

The methods can further comprise pre-selecting the sample such that the sample can be known to comprise MAC. The methods can also comprise determining at least one shift in a cell population value that measures chromatin distribution inside cellular nuclei within the cell population.

Methods of making a dataset comprising discriminant image cytometry features associated with MAC are also provided. The methods can comprise: a) providing a digital cytometric image of a tissue sample exhibiting MAC; b) analyzing cells in the sample that have a certain DNA content to determine to determine at least one of an optical intensity, optical density (OD) and an integrated optical density (IOD) value of the DNA content to provide an initial DNA content measure; c) determining a photometric correction factor that adjusts the initial DNA content measure to provide a corrected DNA content measure of the certain DNA content cells, which corrected DNA content measure has a relative value substantially equal to a reference DNA content measure for cells of substantially equivalent DNA content in a reference dataset, the reference dataset comprising discriminant image cytometry features associated with MAC; d) applying the photometric correction factor to at least desired pixels of the image to provide adjusted pixel values on at least an optical density scale to provide an adjusted image comprising adjusted data representative of discriminant image cytometry features associated with MAC; and, e) combining the adjusted data with the reference dataset to provide an improved reference dataset.

In another aspect, computer-controlled systems are provided. The system comprises an image cytometer that provides a digital image of a cell, and an operably linked controller comprising computer-implemented programming implementing methods as discussed herein. Computers comprising computer-implemented programming, as well as computer-readable memories, implementing methods or containing datasets or other information as discussed herein are also provided. Datasets produced according to such methods are also provided.

These and other aspects, features and embodiments of the invention are set forth within this application, including the following Detailed Description and attached drawings. In addition, various references are set forth herein that discuss in more detail certain systems, apparatus, methods and other information; all such references are incorporated herein by reference in their entirety and for all their teachings and disclosures, regardless of where the references may appear in this application.

BRIEF DESCRIPTION OF THE DRAWINGS

FIG. 3b depicts a photometric correction of the DNA content histogram of FIG. 3a.

DETAILED DESCRIPTION

For some cancers, such as melanoma (skin cancer), obtaining cells directly from the cancer is not necessarily difficult nor invasive for the patient. However, for many other cancers, obtaining cells directly from the cancer can be difficult and invasive, for example for internal cancers such as breast cancer, lung cancer, stomach cancer, and brain cancer. Accordingly, it would be advantageous to provide computer-implemented systems capable of detecting cancer indirectly, through the detection of MAC, in associated or non-associated tissues. The present invention provides computer-implemented methods and computer systems that measure MAC in associated or non-associated tissues, as well as finding other features in digital images.

Associated tissue as used herein means a biological sample that typically contains cells of the tissue being tested. For example, lung sputum typically contains exfoliated cells from lung. When testing for lung cancer, a sputum sample would be considered an associated tissue. Another example of associated tissue would be a breast aspirate or breast ductal-washing when used for the detection of breast cancer.

Non-associated tissue as used herein means a biological sample that does not typically contain cells of the tissue being tested. For example, if sputum were used to detect breast cancer, a breast aspirate was used to detection lung cancer or buccal mucosa (the inner lining of the lips, cheeks or mouth) was used to detect lung cancer, these would be considered non-associated tissues.

Figure 1:
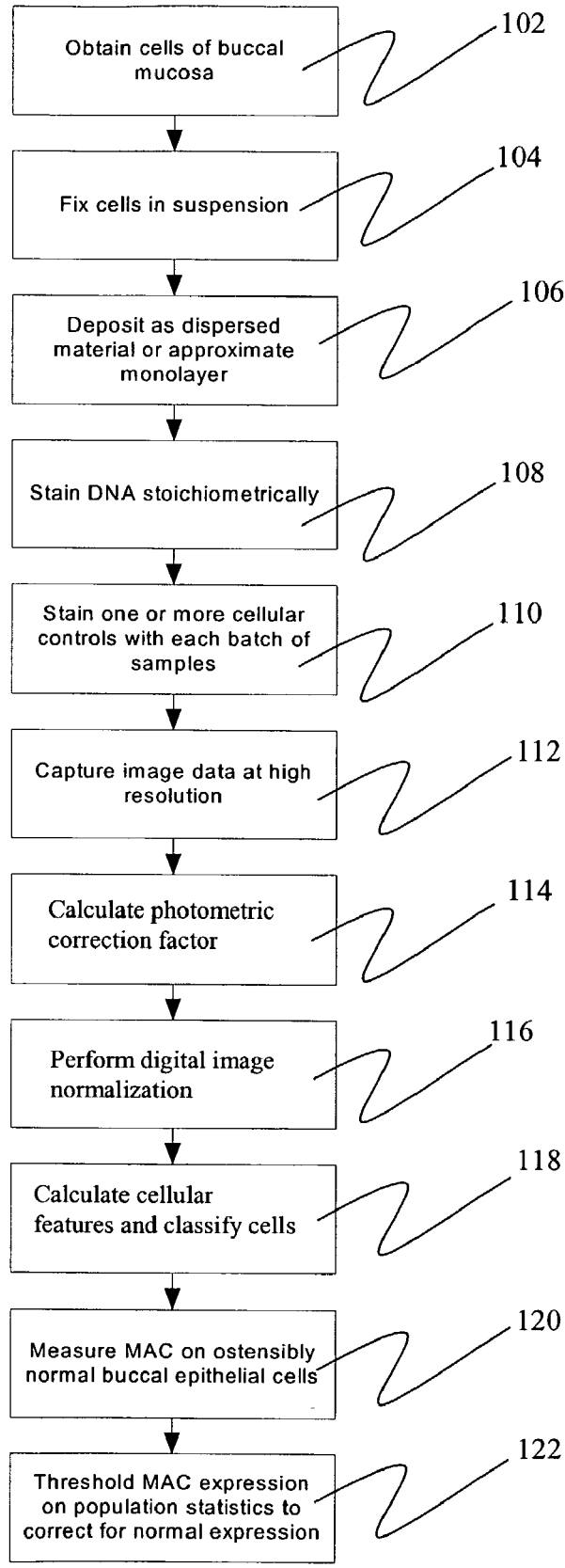
FIG. 1 depicts a flow chart for the determination of MAC.

FIG. 1 depicts one embodiment of a flow chart for obtaining a sample and analyzing it for MAC. Initially, a sample of cells such as Buccal mucosa cells are obtained 102 from a patient suspected of having cancer. The cells are then fixed 104 in suspension and then deposited 106, for example in a dispersed or approximate monolayer, on a receiving surface, such as microscope slide. Other preparation protocols can be used if desired. Stained DNA as used herein means proportionately stained DNA, created, for example, by binding a visible, fluorescent or other stain, antibody, label, or other marker that allows the total amount of DNA and, typically, the spatial distribution of DNA in a cell nucleus to be measured. An example of such a stain is the Feulgen method employing thionin as a stain. Generally, the DNA is stained such that the amount of DNA, and typically its spatial distribution and various cellular features such as size, shape, texture, etc., can be measured based on the interaction between light and the sample. Such interaction may take the form of transmission (e.g., DNA absorbance stains), emission (e.g., fluorescent stains such as propidium iodide, etc., or luminesced), reflection or other emanation to assess cellular features.

The DNA is then stained 108 stoichiometrically, or otherwise proportionally, such that the amount of DNA and the spatial distribution of DNA can be determined on a cell by cell basis by scanning and analyzing the stain, by devices such as an image cytometer. The sample can be any sample of cells, typically cells in vitro but also in vivo or in situ.

Control sample as used herein means a sample of biological or artificial material with known properties such as a cell line, normal epithelial cells, a previously analyzed sample, or calibration beads. Control samples can be used to provide quality control for some aspect of the method, including the measurement system. A control sample could for example be cells that are known to contain MAC or that are known not to contain MAC. Such biological controls can contain growing cells. In such cases, although the dominant cell population will typically be diploid, some cells may be undergoing mitosis during which DNA synthesis occurs. Prior to completion of mitosis a tetraploid cell exists, which has twice the DNA. These tetraploid cells typically divide into two daughter cells. Certain control samples may be stained 110 and processed with test samples and be used to indicate method errors such as overall staining. Similarly, control samples may be used to indicate problems in the measurement system, for example, in the measurement of cellular features. The samples and control samples are then imaged 112 at a photometric and spatial resolution sufficient to discern cell features from the digital images such as size, shape, texture, DNA content and DNA distribution.

For example, in some embodiments, the image cytometer provides a digital or pixelated image of the cells where each pixel is approximately 0.36 micrometer across, which gives an area, 0.36 µm×0.36 µm of approximately 0.1 µm². Normal cells vary widely in size, so the number of pixels in the digital image corresponding to the nucleus or cell also varies accordingly. For example, normal epithelial cell nuclei are approximately 8-10 µm in diameter so a digital image of a typical nucleus at this resolution can have approximately 900 pixels (30×30). Larger and smaller cells, as well as larger or smaller pixels sizes, can also be used as desired.

A photometric correction factor 114 is then calculated. The factor can be calculated independently for each test sample, for groups of samples, or otherwise as desired.

Optical intensity (OI) as used herein means the measurement of the raw amount of light emanated by a sample, for example via transmission, reflection, fluorescence, luminescence, or other approaches. OI indicates the raw light measured on a pixel by pixel basis for the digital image of an object.

Optical density (OD) is used herein means the measurement of OD computed as the logarithm of the ratio of OI of the local background (typically a relatively large value) divided by the OI of an object image pixel (a value that is less than background). OD=log (OI_background/OI_object_pixel)

Integrated Optical Density (IOD) as used herein means the sum of ODs for two or more pixels of the object image. For example an IOD may be calculated as summed ODs down a line of image pixels or the sum of all pixel OD values for a portion of a image, such as a DNA stained nucleus.

The amount of DNA inside a cell nucleus is measured by determining the proportion of the light transmitted through the stained nucleus (other systems such as reflectivity or fluorescence can also be used, if desired). A histogram or other representation of the DNA content, such as optical density, is then provided for a plurality of cells in the sample. In certain embodiments, two hundred to several thousand cells per sample are collected and analyzed. The sample is then analyzed, for example, using a histogram, to identify cells with various amounts of DNA, and more particularly to identify the integrated optical density (IOD) of the diploid peak or other target population having a known or expected amount of DNA.

Reference population as used herein means a sub-population of cells in a sample as determined by at least one cellular feature. For example, size, shape or texture alone or in combination can identify a population of normal epithelial cells. Such a reference population could be used to determine a reference quantity such as a reference IOD. The sample used to determine a reference population may also include a control sample such as cells that are intentionally added to the sample, such as a cell line, other cells or material with known properties.

Reference IOD as used herein means an IOD value derived from a reference population. The reference IOD value may be measured from the mean, mode, median or other value derived from the reference population. For illustration purposes, such a reference IOD may be indicated on a histogram such as the IOD of DNA stained cells versus frequency.

Typically, the sample's diploid peak represents the most dominant population of cells, however, other reference points derived from a reference population, such as a tetraploid peak could also be used. As discussed herein, for a variety of reasons, staining variations can occur from sample to sample, or between batches of samples. It is therefore desirable to adjust for these staining variations, using a process that normalizes or otherwise adjusts the images of the cells in these samples so that their DNA content, DNA distribution, or other cellular features can be directly compared.

Target IOD as used herein means an experimental constant such as an IOD value that is chosen for convenience, computational ease or other practical consideration, for example an IOD of 100. A target IOD could also be derived from a control sample, reference population or other useful material with known or expected characteristics. Other target references are also suitable, such as target OIs or target ODs.

To accomplish image normalization, a photometric correction factor is calculated for each desired sample. For example, assuming that the IOD measured at the diploid peak of a test sample (reference population) is 120, the photometric correction factor is calculated as the target IOD/measured IOD of that reference population. In this instance the calculation would be 100/120 yielding a photometric correction factor for this test sample of approximately 0.833. This photometric correction value provides an approach to normalize digital images and therefore correct for DNA content as well as other cellular features (as used herein, cellular features refers to optical features determined from images of cells) due for example to staining variance.

Reference data set as used herein means any known data set comprising information such as images of cell nuclei, or features calculated from images of cell nuclei such as size, shape, texture, etc., alone or in combination to indicate the presence of MAC. Such reference data set may be stored in computer memory, on disk or any other useful data storage medium. For example, a reference data set could be a collection of cell features, or combination of cell features, or be the result of discriminant functional analysis as measured on a variety of samples taken from non-cancerous individuals. Such a reference data set could be used for example in comparing the MAC value of test samples.

The optical density or other optical strength measurement on the reference data set is correlated to the sample under examination.

Suitable optical features for the discrimination of MAC can be determined in the lab, or can be determined by reference to articles and patents such as those cited above, Finch, et al.; Klawe et al.; U.S. Pat. No. 5,889,881; U.S. Pat. No. 6,026,174.

Digital image normalization 116 is then performed by applying the photometric correction factor to the OD of each desired pixel or group of pixels of the digital image for each desired cell in the test sample. In this manner the digital image is normalized 116 and subsequently, every desired cellular feature calculated from the normalized digital image is automatically normalized. These normalized cellular features can be used to analyze and classify cells 118, and to compare the presence of MAC between non-cancerous individuals as represented by a reference data set and the test sample. The photometric correction factor can be applied to cells segmented, or otherwise separated, from the remainder of the image, or on all objects in the image, or otherwise to the image as desired. In terms of optical density, objects are indicated in the image by a pixel or a group of pixels that measure greater than background. Objects also include pixels that themselves may not be of such optical density, but are located within a structure or established boundary such as the perimeter of the nucleus. For example, pixels corresponding to substantially empty cytoplasm within a cell may have a low optical density, and thus be substantially similar to background optical density, yet still be within an object because they are located within the cellular membrane, which membrane can be identified by routine segmentation techniques. Although OD is discussed in some detail, similar methods as described may be applied to correct a digital image and to normalize a digital image represented as OI or IOD. Similarly, although certain examples discuss OD and absorbance stains, derivation of a photometric correction factor (as an example of a correction factor that may be applied to correct for staining variation for the Feulgen method, using digital image normalization), the computerized methods discussed herein provide general methods and algorithms to reduce method variables, such as staining, and more particularly to provide improved assessment of DNA and thus MAC (for example to be used diagnostically, to detect of cancer, assess wellness, etc.).

Applying the photometric correction factor, which can also be termed an adjustment coefficient, to desired pixels in the object in the image provides adjusted pixel values on at least an optical density scale and thus provides an adjusted image. The data or optical features from the adjusted pixel values can then be compared to the optical features in the reference data set to discriminate the optical features in the sample and determine therefrom whether the sample comprises MAC. If desired, the photometric correction factor can also be determined and/or applied to provide adjusted pixel values on an optical intensity scale, which is identified as the global feature normalization 116 in FIG. 1. Images can then be classified 118 and MAC can be measured on the sample cells 120. If desired, in addition the MAC expression data can be compared and thresholded 122 against population statistics to correct for normal expression patterns within the cells.

Figure 2:
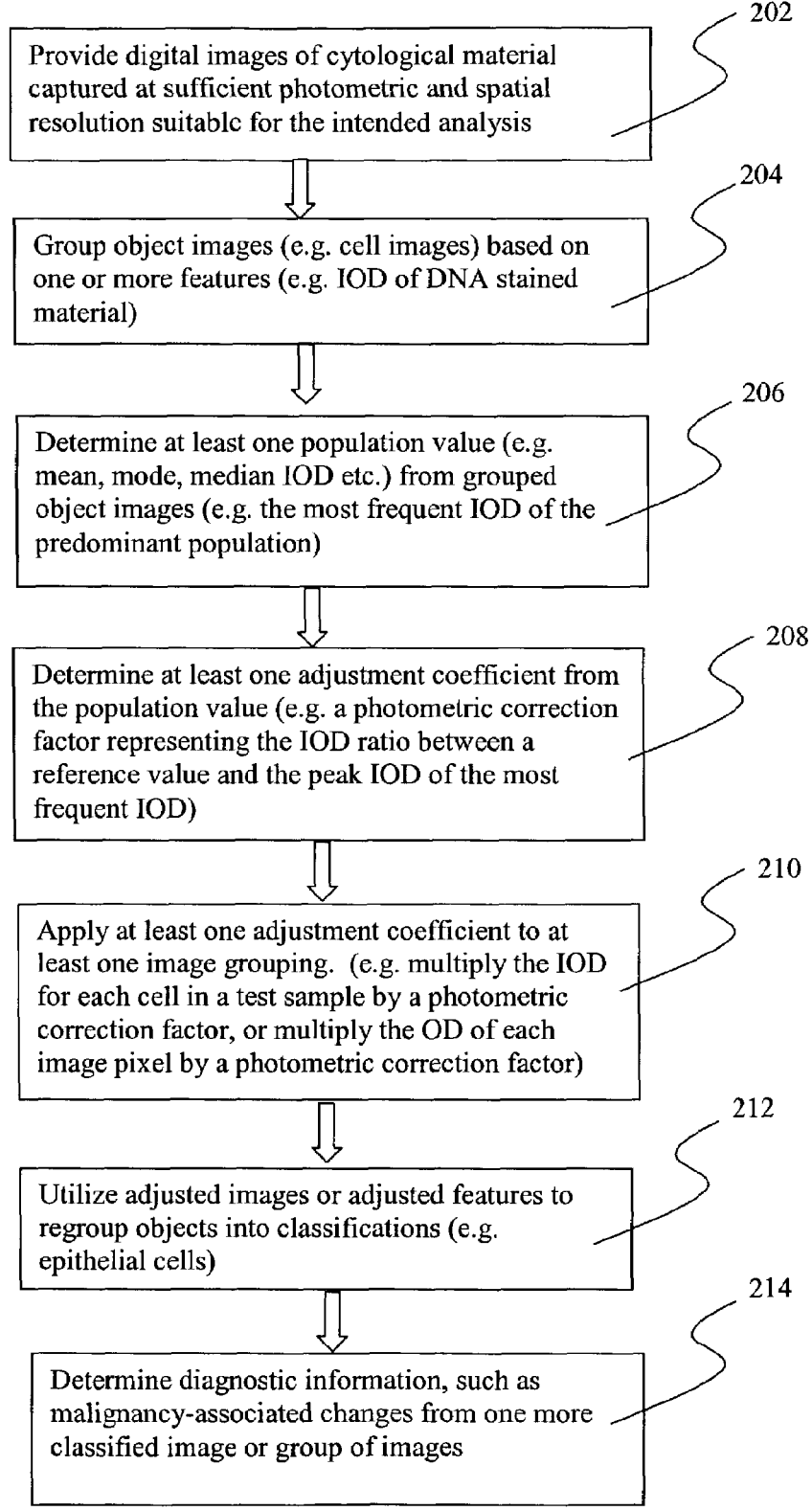
FIG. 2 depicts a flow chart directed to adjusting pixels in images from an image cytometer.

FIG. 2 depicts a flow chart directed to an embodiment of the feature normalization or correction aspect of the present invention. Initially, at least one digital image of cytological material captured at sufficient photometric and spatial resolution suitable for the intended analysis is provided 202. The image can be of any appropriate suspect tissue. Certain aspects of the methods and systems of the present invention can be applied both to samples comprising either or both cancerous or non-cancerous tissues although for the determination of MAC the tissue will typically be selected from substantially non-cancerous tissues. The sample comprises enough cells having proportionally stained DNA to provide a measure of cellular features such as size, shape, texture, DNA content, etc., and identify certain reference populations of the cells.

Cells are analyzed to group object images 204 based on one or more cellular features or combination of cellular features (e.g., to define a reference population). The reference population, for example diploid cells, are then analyzed 206 to determine a reference IOD measured from a population value such as the mean, mode, peak or median IOD of that reference population.

Next, an adjustment coefficient, such as the photometric correction factor is determined 208. In this example, a photometric correction factor is calculated from a target IOD/reference IOD. Subsequently this photometric correction factor is applied to desired pixels of each desired digital image from the sample 210. This example (photometric correction factor) of an adjustment coefficient in this instance will normalize the desired digital images thus correcting for differences in optical density or darkness of the stain due to staining variations or other artifacts, as opposed to differences in optical density due to the amount of DNA in the cell. The desired pixels are typically all pixels or desired groups of pixels within an object boundary, such as the digital image of a cell nucleus, although larger or smaller subsets can be selected if desired.

Next, 212, cellular features are calculated from the adjusted pixels (normalized images). As a result of image normalization, all cellular features calculated from a normalized image are automatically corrected. These corrected features are then used alone or in combination to form classifiers that further identify cells or groups of cells. Values derived from cells or groups of cells accomplished by classifiers are then compared to a reference data set 214 to determine diagnostic information such as the presence or absence of MAC in one or more of the cells in the sample. The determination of MAC can include analyzing cellular features or combinations of cellular features for individual cells or populations of cells which in turn may be compared with a reference data set. The determination of MAC then provides for determining whether malignancy is indicated in the patient; if the patient exhibits increased characteristics of MAC, then the patient has an increased possibility of having a cancer such as lung cancer, breast cancer, skin cancer, brain cancer or other cancers.

Figure 3A:
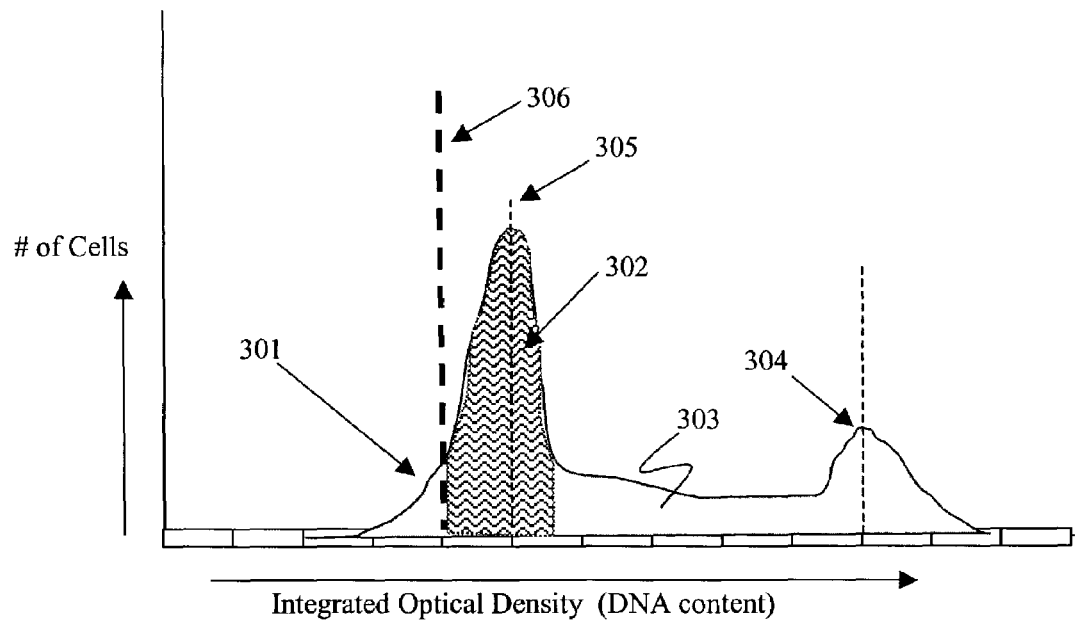
FIG. 3a depicts a DNA content histogram of cells from Buccal mucosa.
Figure 3B:
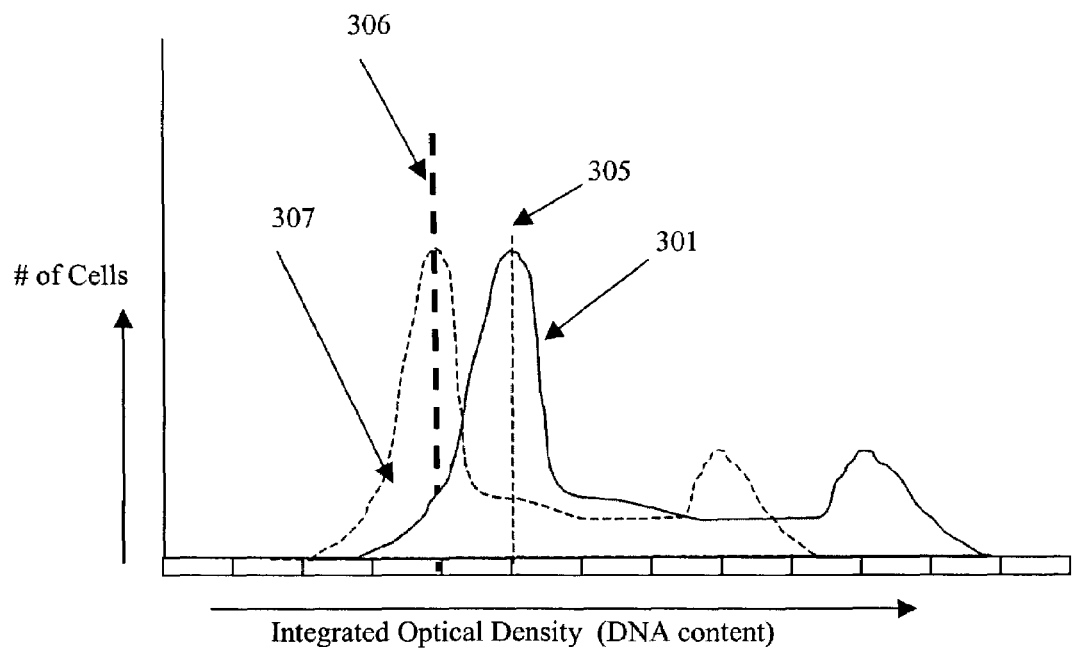
Figure 4:
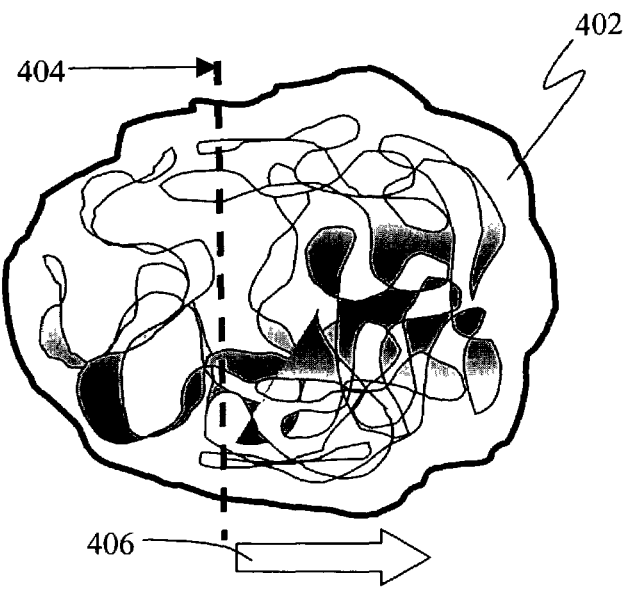
FIG. 4 depicts in stylized fashion the cytometric imaging of a cell and an optical density scan produced from the imaging.
Figure 4:
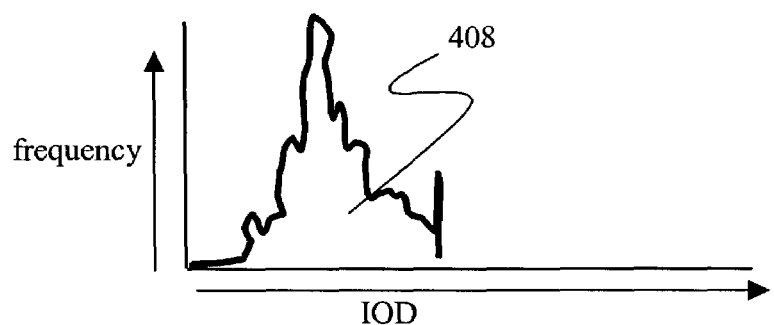
Figure 4:
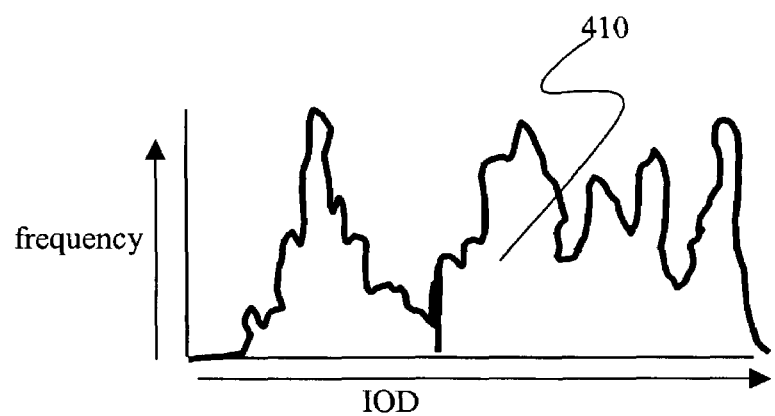

FIGS. 3a and 3b provide graphs depicting integrated optical density (DNA content) histograms before and after correction. As depicted in FIGS. 3 and 4, the optical assessment can be based upon the integrated optical density of the cells. In alternative embodiments, optical assessment can be based upon optical density, optical intensity, or the integrated optical density of desired pixels, such as those in a line, column or other useful combination.

In FIG. 3a the DNA content histogram 301 of the cells has a diploid region 302 that extends two SD on each side of its peak 305. In the sample depicted, the majority of the cells fall into the diploid region 302. Some cells are in DNA synthesis 303 and still others have completed DNA synthesis and fall in tetraploid region 304. Based on stoichiometry, (and assuming linearity for the measuring device), the value of peak population IOD 304 is twice the peak value IOD of the diploid peak 305; non-linear relationships can be established if desired, and the various methods herein adopted accordingly. The peak IOD of the control sample (reference) is identified as 306.

FIG. 3b depicts the DNA histogram of FIG. 3a corrected by a photometric correction factor such that the DNA diploid peak 305 is corrected downwardly by twenty percent to match the target IOD value 306. Therefore this test sample requires a photometric correction factor of approximately 0.833 (i.e., 100/120), which can subsequently be applied to the IOD measurement of every desired cell represented in the histogram 301, thereby providing the corrected IODs for all desired cells in the test sample as represented by 307.

The relative intensity values of a reference population of the sample and the target IOD are thus rendered substantially equivalent with regard to the optical density of the cells on the basis of the amount of DNA in the cells.

The statistical accuracy of the histogram will vary as additional data is collected. Accordingly, in some embodiments, the sample IOD can be corrected iteratively. Such iteration can continue, if desired, until certain conditions are met. For example, the photometric correction may be performed after groups of two hundred cells are accumulated in the diploid region or peak and continued until two thousand cells from the sample are located in this region. One advantage of this on-the-fly process is that the image acquisition and thresholding can be modified to reduce the acquisition of debris and or otherwise improve the efficiency of data collection and analysis.

FIG. 4 depicts an example of determining a cell texture feature. The optical density (OD) is measured along the digital image 402 of a cell nucleus and pixel ODs are summed along the line 404. The line of integration 404 as depicted is moving across the image in the direction of the arrow indicated by 406, from left to right, so as to build a profile 408 and when completed is illustrated as the completed profile 410.

Figure 5A:
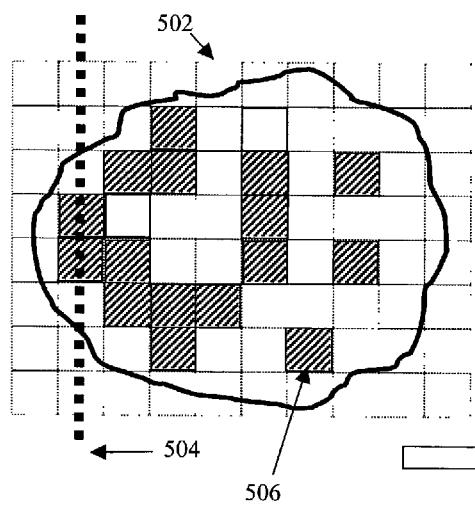
FIGS. 5a and 5b each depict a stylized digital image of the cell depicted before (FIG. 5a) and after (FIG. 5b) computer-implemented image and feature normalization.
Figure 5B:
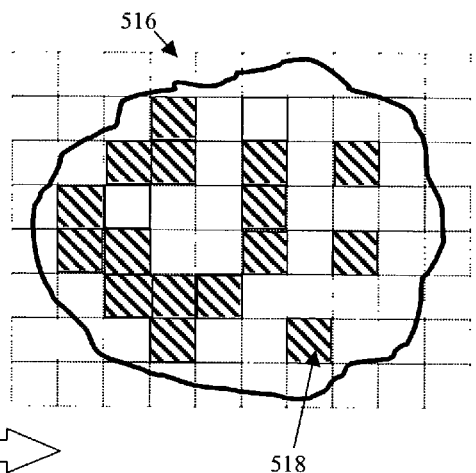
Figure 5B:
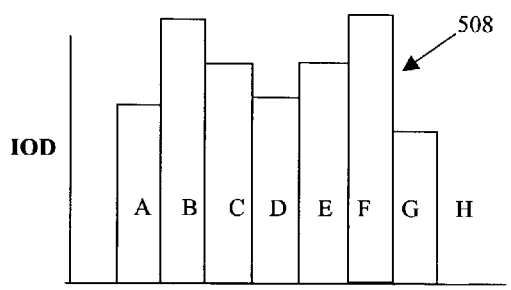
Figure 5B:
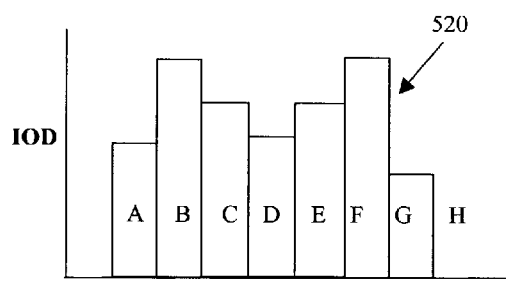

FIGS. 5a and 5b provide corresponding views of a stylized digital image 502, 516 of a DNA stained cell nucleus such as that scanned in FIG. 4.

In the representative digital image 502 of FIG. 5a, all image pixels have an optical density (OD). A representative group of pixels 506, having the same OD are illustrated as being distributed over the digital image. Analysis line 504 indicates a column of pixels that are to be summed, thus generating an integrated optical density (IOD) for that column. As the analysis line 504 moves across the digital image 502, the IOD values for each column are calculated and are presented in histogram 508. The table 510, below, shows numeric representation of these IOD values taken from the digital image 502 and represented by the histogram 508.

Various cellular features can be calculated from a digital image. In this example, the numeric differences between adjacent columns of IOD values are summed and each of these values is squared. IOD differences from neighbor to neighbor in histogram 510 are calculated (e.g., the difference between A to B is 120−72=48). Then, in this representative cell feature calculation, these differences are squared and summed to produce a single representative feature value 512, which in this instance, is a cellular feature having a value of 12,056.

If a correction factor, such as the 0.833 from FIG. 4, were applied by multiplying this squared and summed value (12,056), a new feature value 514 would result, with a value of 10,043.

FIG. 5b shows an adjusted digital image 516 obtained by normalizing or photometrically correcting digital image 502. The image was corrected by adjusting the pixel OD, and the summed IOD, by the photometric correction factor (0.833) before feature calculation.

FIG. 5b shows each desired pixel OD in the digital image 502 being multiplied by the 0.833 correction factor to produce the normalized digital image 516. This process is further seen for the representative pixel values having ODs 520 being corrected so as to produce OD values 518 in the processed digital image 516. Once the correction factor has been applied to every desired pixel of the digital image 502, (a process called global image normalization) the resulting digital image 516 is said to be normalized.

As in FIG. 5a, the OD values for each column of pixels in the normalized digital image 516 of FIG. 5b are summed to produce an IOD for that column. This is further represented by the IOD histogram 520 appearing below the digital image. The same calculations applied in FIG. 5a are then applied to the IOD values derived from the normalized digital image 516, represented in the IOD histogram 520, and in numeric form represented in table 522. The calculations in this instance, for the same representative cellular feature, produce a value 524 of 8,400 which is different and more representative than the value 512 of 12056 or the directly corrected feature 514 having a value of 10043. Cellular features calculated subsequent to image normalization are automatically normalized and therefore more closely represent the optical aspects of the image free from variations due to staining. These normalized (or corrected) cellular features maintain their discriminating power to better allow differences between samples to be measured. Such photometric correction and digital image normalization may have particular applicability when trying to measure subtle cellular features such as malignancy-associated changes as indicated in part by the measurement of the spatial distribution of DNA in cell nuclei. Similarly, in addition to correcting for staining variation, the general method provides approaches to calculate adjustment coefficients to help correct for other method-related variables.

Similar to the adjustment of image data, a reference data set can contain images or features that may subsequently be normalized, adjusted, updated, either discretely or continuously, as additional information is obtained from normal or MAC cells (or other characteristic under investigation).

Thus, if desired, both the reference data set and the sample images can be updated on the fly, discretely or continuously, or otherwise as desired.

Figure 6:
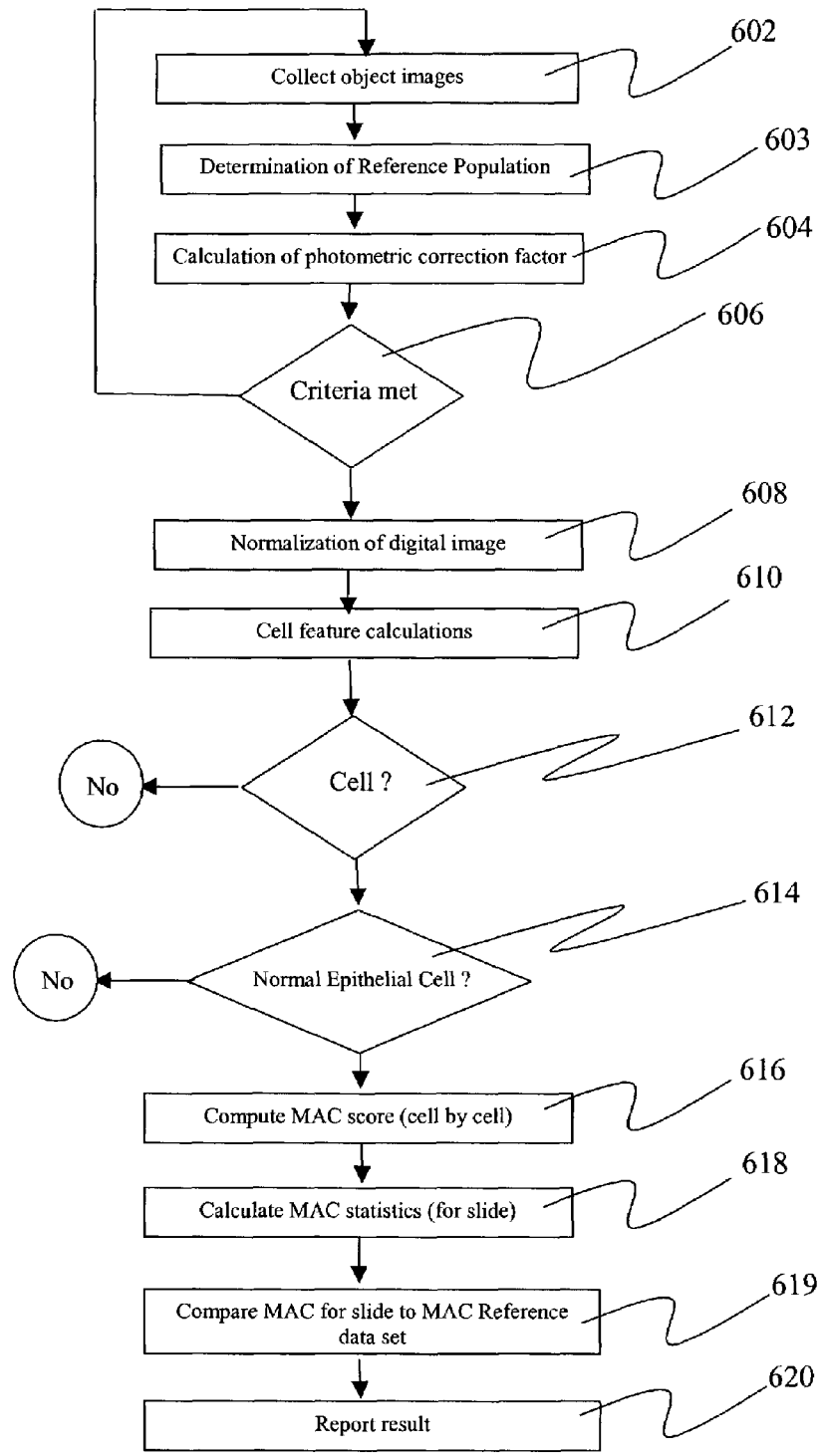
FIG. 6 depicts a decision tree flow chart to determine MAC in a cellular sample.

FIG. 6 depicts a flow chart comprising computation steps for the determination of MAC, for example, in buccal mucosa for the detection of lung cancer. This depiction illustrates the calculation of one type of cellular feature, many other cellular features are typically calculated and are grouped to form discriminate functions (e.g., cell classifiers) that allow decisions to be made, for example, shape, size and the illustrated cellular texture feature may be used to identify a type of cell such as an epithelial cell. In FIG. 6, image data collection 602 is followed by determination of a reference population 603 and the calculation of the photometric correction factor 604, discussed more fully elsewhere herein, for example with reference to FIGS. 1 and 2, and also further below. Decision point 606 determines whether at least one selected criterion is met. If met, then, in the embodiment depicted, the image is subjected to global image normalization 608 followed by feature calculation 610. Decision point 612 determines whether the object is a cell or an artifact, and if it is a cell, then the cell is analyzed at decision point 614 to determine whether it is the type of cell being sought, for example, a normal epithelial cell having diploid characteristics. In the embodiment shown, MAC score(s) are then computed, cell by cell 616, and slide by slide 618, based on population statistics. Statistics calculated for the slide, such as a MAC score may be compared to a reference data set indicated by step 619 and a result 620 is derived to indicate the presence or absence of MAC in the sample or to derive other diagnostic information.

Turning to a further discussion of certain embodiments, the present invention is directed to computer-implemented methods for the determination of cellular or more generally optical features that are useful in image recognition or for other purposes. In certain embodiments, the methods comprise analysis, and capture if desired, of digital cytometric images of a substantially non-cancerous tissue sample. The tissue sample can be obtained, for example, via biopsy, from resected tissue, fine needle aspirates, from sputum, tissue scrapings, nipple aspirates, or otherwise as desired. The sample can be obtained from a potential cancer patient, from a patient as part of follow-up to monitor treatment, from a patient to detect residual disease or to assess wellness, or to screen a high risk group, such as smokers, or otherwise as desired. The methods can also be applied to all tissue and to various other species.

The sample comprises enough cells to determine a reference population of cells having a certain DNA content. The cells are typically proportionally stained such that the amount of stain is proportional to the amount of DNA in the cells. Examples of such stoichiometric stains include Feulgen stains and other stains, labels, markers, etc.

In certain aspects, the present invention provides a reference data set containing MAC-indicative features wherein the reference data set is created over time via the accumulation of data from MAC-exhibiting cells. The digitized images of the cells are normalized according to the methods discussed herein before or as they are incorporated into the reference data set to provide an improved dataset. Thus, in addition to the methods of determining MAC, the present invention additionally provides computer-implemented programming, computer-readable memories, and computers containing such programming and memories (as used herein, computers or controllers include individual computers, computers that are part of a network, computers with peripherals, or any other logic-implementing device suitable for use with the present invention). Thus, the reference data set comprises discriminate imaging cytometry features that are associated with MAC.

The photometric correction factor adjusts the optical measurements such that the diploid cells have a DNA content value that is relatively the same as the DNA content value of the cells of the reference data set, for example each being set at one or one hundred, for a diploid cell, with the same ratio for a tetraploid peak being set at two or two hundred, respectively. Thus, the optical measurements of the certain DNA content cells are adjusted substantially to a predetermined target value corresponding to optical measurements within a reference a data set that comprises optical measurements indicating the presence or absence of MAC. In addition, the reference data set can contain the discriminant features for the MAC either directly or by reference to a data set with such features (for example, the photometric correction factor either can be applied directly to the MAC-containing reference data set itself, or via an intermediate data set(s) against which both the sample and the MAC data set are normalized). This conforms the staining level of the new sample to the level of staining observed or averaged or otherwise obtained in the sample data set.

The photometric correction factor is then applied to any desired pixels in the image to provide adjusted pixels values on at least an optical density scale to provide a normalized digital image. Typically, the desired pixels are located in objects, which indicates anything within the image that has an intensity level below background (i.e., transmits less than background) or within any area, such as a cellular membrane or other partial or fully circumferential perimeter. For example, in images of nuclei, nucleoli, or cytoplasm, some of the images may have an intensity level or optical density that is substantially the same as background yet the pixels are located within an object and thus are actually part of a cell. Typically, the adjusted pixel values are first calculated on the optical density scale and then, if desired, on an optical intensity scale. This then provides an adjusted image. Next, data or optical features from the adjusted pixel values or image are compared to the reference data set to discriminate the optical features in the sample. From such optical features, the possibility that the sample comprises MAC can be determined. In other words, optical features are calculated from the normalized digital image, then the optical features determined from the normalized image are compared to the reference data set to determine whether the sample comprises MAC.

Typically, the optical intensity, optical density, IOD, corrected DNA content measure, etc., may be corrected by multiplying the given measure or value by the photometric correction factor. The optical measurement can comprise measuring an integrated optical density (IOD), the reference data set can comprise a target IOD, and the photometric correction factor can be determined as target IOD/measured IOD. The digital image can comprise optical intensity information and the optical intensity can corrected by multiplying the optical intensity by the photometric correction factor.

In certain embodiments various features of the methods can be applied iteratively. For example, the step of analyzing the DNA content cells to determine the initial DNA content measure and the step of determining the photometric correction factor can be repeated at least once as a desired number of additional cells are scanned or imaged and thus ready for analysis. For example, such groups of cells can comprise about fifty, one hundred, two hundred, five hundred, or one thousand as more cells in the sample are imaged.

If desired, the features of applying the photometric correction factor to the desired pixels in the objects and comparing the data from the adjusted pixel values to the referenced data set can also be repeated with each iteration. If desired, the iterative repetition of the various aspects of the methods can be iterated on a one to one ratio, or certain features can be iterated more often or less often than other features. Such iteration can provide improved adjusted pixel values and an improved determination of at least one optical feature associated with MAC and preferably a plurality of optical features associated with MAC.

Typically, the adjustment applies the photometric correction factor to substantially all pixels in objects in the image, further preferably all pixels in such objects. If desired, the correction photometric correction factor can be applied to all pixels in the image whether in objects or not.

In certain embodiments, one or more controls can be provided. The controls provide at least one pixelated cytometric image of a known substance having a known optical density. The controls can either be maintained separately from the sample or can be stained simultaneously or sequentially with the sample. The control may or may not be a stainable substance. The optical features associated with MAC can be determined using either non-linear or linear functions. Other functions can also be used if desired. The determination of MAC can comprise determining at least one shift in a cell population value that measures chromatin distribution cellular nuclei within cellular population.

In some embodiments, the patient can be suspected of having a specific, selected malignancy and the sample can be from an associated or non-associated tissue. For example, the selected malignancy can be an internal cancer, which indicates a cancer that is located within the person and not easily reachable without invasive actions by the surgeon. Exemplary internal cancers include lung and breast cancer, but do not include skin or lip cancer (unless the melanoma or lip cancer is located deep under the skin thus requiring disruption of significant healthy tissue or causing significant discomfort to the patient to obtain a sample of the cancer). Available tissue indicates tissues that are readily available to the surgeon, for example, skin, buccal mucosa, nipple aspirates, and ductal washings. In some embodiments, the collective malignancy is lung cancer and the non-associated tissue is buccal mucosa, while in other embodiments, the selected malignancy is breast cancer and the non-associated tissue is any one of buccal mucosa, nipple aspirates, and ductile washings The patient can be any suitable animal, but is typically human.

In addition the present invention provides computer-controlled systems comprising an image cytometer that provides pixelated images of a cell and an operably linked controller comprising computer-implemented programming that implements the methods discussed herein. Also provided are the computers or controllers themselves, as well as computer memories containing and implementing the procedures discussed herein and/or containing or implementing the reference data set as discussed herein.

All terms used herein are used in accordance with their ordinary meanings unless the context or definition indicates otherwise. Also unless indicated otherwise, except within the claims, the use of "or" includes "and" and vice-versa. Non-limiting terms are not to be construed as limiting unless expressly stated (for example, "including," "having," and "comprising" mean "including without limitation" unless expressly stated otherwise).

The scope of the present invention includes both means plus function and step plus function concepts. However, the terms set forth in this application are not to be interpreted in the claims as indicating a "means plus function" relationship unless the word "means" is specifically recited in a claim, and are to be interpreted in the claims as indicating a "means plus function" relationship where the word "means" is specifically recited in a claim. Similarly, the terms set forth in this application are not to be interpreted in method or process claims as indicating a "step plus function" relationship unless the word "step" is specifically recited in the claims, and are to be interpreted in the claims as indicating a "step plus function" relationship where the word "step" is specifically recited in a claim.

From the foregoing, it will be appreciated that, although specific embodiments of the invention have been discussed herein for purposes of illustration, various modifications may be made without deviating from the spirit and scope of the invention. Accordingly, the invention includes such modifications as well as all permutations and combinations of the subject matter set forth herein and is not limited except as by the appended claims.

What is claimed is:

1. A computer-implemented method of photometrically correcting digital images for the analysis of cellular features, comprising:
   a) providing at least one digital image of a sample of DNA stained cells, the sample comprising enough cells to determine a reference population in said sample of cells having a certain DNA content, the digital image comprising a plurality of individual pixels;
   b) determining a photometric correction factor that adjusts an optical measurement value of the certain DNA content cells of the sample substantially to a predetermined target value corresponding to optical measurements within a reference data set, wherein the photometric correction factor is determined based on a ratio of an experimental constant to an optical measurement value of the certain DNA content derived from the reference population determined from the sample;
   c) applying the photometric correction factor to individual pixels within said plurality of individual pixels, said individual pixels comprising desired pixels of the digital image for each desired cell in the sample to provide a normalized digital image;
   d) calculating at least one optical feature from the normalized digital image.

2. The method of claim 1, further comprising determining if the sample has malignancy-associated changes by comparing the at least one optical feature determined from the normalized digital image to the reference data set.

3. The method of claim 2, wherein the reference data set comprises at least one of images of cell nuclei and features calculated from images of cell nuclei.

4. The method of claim 2, wherein the reference data set comprises at least one of a collection of cell features, a combination of cell features, and a result of discriminant functional analysis.

5. The method of claim 2, wherein the reference data set comprises a collection of cell features associated with malignancy-associated changes.

6. The method of claim 2, wherein the reference data set is stored on a data storage medium.

7. The method of claim 1, wherein the optical measurement value of the certain DNA is at least one of an integrated optical density value, an optical density value, and an optical intensity value of the certain DNA content, and is derived from the reference population determined from the sample.

8. The method of claim 1, wherein the experimental constant is chosen for at least one of convenience, computational ease, and other practical consideration.

9. The method of claim 1, wherein the experimental constant is chosen from the group consisting of an integrated optical density value, an optical density value, and an optical intensity value, and is derived from at least one of a control sample, a reference data set, and a material with known characteristics.

10. The method of claim 1, wherein said photometric correction factor adjusts optical measurements such that the ratio of the DNA content value of the cells of the sample to the DNA content value of the cells of the reference data set is about 1 for diploid cells and about 2 for tetraploid cells.

11. The method of claim 1, wherein the desired pixels comprise one of substantially all the pixels within an object boundary and a desired group of pixels within the object boundary.

12. The method of claim 11, wherein the object boundary is the perimeter of a nucleus.

13. The method of claim 1, further comprising applying the photometric correction factor to substantially all pixels in the digital image.

14. The method of claim 1, further comprising performing at least one of steps b) and c) iteratively.

15. The method of claim 1, further comprising performing at least one of steps b) and c) iteratively as significantly more cells in the sample are analyzed to provide an improved photometric correction factor.

16. The method of claim 15, further comprising performing step d) iteratively.

17. The method of claim 1, further comprising performing step d) using at least one of a non-linear function and a linear function.

18. The method of claim 1, wherein the stained DNA is stained proportionately.

19. The method of claim 18, wherein the stained DNA is stained with a Feulgen staining method.

20. The method of claim 19, wherein the stained DNA is stained with at least one of an absorbance stain, a fluorescence stain, an antibody, and a label.

21. The method of claim 1, further comprising providing a control comprising at least one image of a known substance having a known optical density.

22. The method of claim 21, further comprising at least one of staining said control substantially simultaneously with the sample and staining said control substantially sequentially with the sample.

23. The method of claim 22, wherein the sample is from a patient potentially having a selected malignancy and the sample is from a non-associated tissue.

24. The method of claim 23, wherein the selected malignancy is an internal cancer and the non-associated tissue is an available tissue.

25. The method of claim 24, wherein the selected malignancy is lung cancer and the non-associated tissue comprises at least one of a buccal mucosa, a nipple aspirate, and a ductal washing.

26. The method of claim 24, wherein the selected malignancy is breast cancer and the non-associated tissue comprises at least one of a buccal mucosa and a sputum.

27. A system comprising:
  an image cytometer that provides a digital image of a cell; and
  a computer linked to the cytometer and comprising a computer-readable medium storing computer-implemented programming implementing the method of claim 1.

28. A computer comprising a computer-readable medium storing computer-implemented programming implementing the method of claim 1.

29. A computer-implemented method of photometrically correcting digital images for the analysis of cellular features, comprising:
  a) providing at least one digital image of a sample of DNA stained cells, the sample comprising enough cells to determine a reference population in said sample;
  b) determining a photometric correction factor comprising a ratio of an experimental constant to an optical measurement value of the reference population;
  c) applying the photometric correction factor to desired pixels of the digital image for each desired cell in the sample to provide a normalized digital image;
  d) calculating at least one optical feature from the normalized digital image; and
  e) determining if the sample has malignancy-associated changes by comparing the at least one optical feature determined from the normalized digital image to a reference data set, wherein the sample is from a patient suspected to have a selected malignancy and the sample is from a non-associated tissue.

30. The method of claim 29, wherein the reference data set comprises at least one of images of cell nuclei and features calculated from images of cell nuclei.

31. The method of claim 29, wherein the reference data set comprises at least one of a collection of cell features, a combination of cell features, and a result of a discriminant functional analysis.

32. The method of claim 31, wherein the reference data set comprises samples taken from non-cancerous cells.

33. The method of claim 29, wherein the reference data set is stored on a data storage medium.

34. The method of claim 29, wherein the optical measurement value is at least one of an integrated optical density value, an optical density value, and an optical intensity value.

35. The method of claim 29, wherein the experimental constant is chosen for at least one of convenience, computational ease, and other practical consideration.

36. The method of claim 29, wherein the experimental constant is an optical measurement value of a material with known characteristics.

37. The method of claim 29, wherein the experimental constant is an optical measurement value of a material with expected characteristics.

38. The method of claim 29, wherein the desired pixels comprise one of substantially all the pixels within an object boundary and a desired group of pixels within the object boundary.

39. The method of claim 38, wherein the object boundary is the perimeter of a nucleus.

40. The method of claim 29, further comprising applying the photometric correction factor to substantially all pixels in the digital image.

41. The method of claim 29, further comprising performing at least one of steps b) and c) iteratively.

42. The method of claim 29, further comprising performing at least one of steps b) and c) iteratively as significantly more cells in the sample are analyzed to provide an improved photometric correction factor.

43. The method of claim 42, further comprising performing step d) iteratively.

44. The method of claim 29, further comprising performing step d) using at least one of a non-linear function and a linear function.

45. The method of claim 29, wherein the stained DNA cells are stained proportionately.

46. The method of claim 45, wherein the stained DNA cells are stained with a Feulgen staining method.

47. The method of claim 45, wherein the stained DNA cells are stained with at least one of an absorbance stain, a fluorescence stain, an antibody, and a label.

48. The method of claim 29, further comprising providing a control sample having at least one known property.

49. The method of claim 48, further comprising at least one of staining said control sample substantially simultaneously with the sample and staining said control sample substantially sequentially with the sample.

50. The method of claim 29, wherein the selected malignancy is an internal cancer and the non-associated tissue is an available tissue.

51. The method of claim 50, wherein the selected malignancy is lung cancer and the non-associated tissue comprises at least one of a buccal mucosa, a nipple aspirate, and a ductal washing.

52. The method of claim 50, wherein the selected malignancy is breast cancer and the non-associated tissue comprises at least one of a buccal mucosa and a sputum.

53. A system comprising:

an image cytometer that provides a digital image of a cell; and a computer linked to the cytometer and comprising a computer-readable medium storing computer-implemented programming implementing the method of claim 29.

54. A system comprising:

an image cytometer that provides a digital image of a cell; and a computer linked to the cytometer and comprising a computer-readable medium storing computer-implemented programming implementing the method of claim 29.

55. A computer comprising a computer-readable medium storing computer-implemented programming implementing the method of claim 29.

56. A computer comprising a computer-readable medium storing computer-implemented programming implementing the method of claim 29.

* * * * *

UNITED STATES PATENT AND TRADEMARK OFFICE
CERTIFICATE OF CORRECTION

PATENT NO. : 7,274,809 B2
APPLICATION NO. : 10/232698
DATED : September 25, 2007
INVENTOR(S) : Calum E. MacAulay et al.

It is certified that error appears in the above-identified patent and that said Letters Patent is hereby corrected as shown below:

On Title Page
Item (75) Inventors: "Calum E. MacAulay, Vancouver, CANADA;
Alexei K. Doudkine, Delta, CANADA;
David M. Garner, Vancouver, CANADA;
Margareta Flezar, Ljubljana, SLOVENIA;
Mario Zganec, Golnik, SLOVENIA;
Jaka Lavrencak, Ljubljana, SLOVENIA;
Branko M. Palcic, Vancouver, CANADA;
Gary W. Ferguson, Burnaby, CANADA;"

should be -- Calum E. MacAulay, Vancouver, CANADA;
Alexei K. Doudkine, Delta, CANADA;
David M. Garner, Vancouver, CANADA;
Marija Us-Krasovec, Ljubljana, SLOVENIA;
Margareta Flezar, Ljubljana, SLOVENIA;
Mario Zganec, Golnik, SLOVENIA;
Jaka Lavrencak, Ljubljana, SLOVENIA;
Branko M. Palcic, Vancouver, CANADA;
Gary W. Ferguson, Burnaby, CANADA; --

Signed and Sealed this

Twenty-fifth Day of March, 2008

JON W. DUDAS
*Director of the United States Patent and Trademark Office*